(12) United States Patent
Ohseki et al.

(10) Patent No.: US 6,425,257 B1
(45) Date of Patent: Jul. 30, 2002

(54) AIR CONDITIONER

(75) Inventors: Shigeki Ohseki, Nagoya; Takaaki Ohtsuka, Nishi-kasugai-gun; Hideaki Kasahara, Nishi-kasugai-gun; Atsushi Yoshimura, Nishi-kasugai-gun, all of (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/912,363

(22) Filed: Jul. 26, 2001

(51) Int. Cl.[7] .............................................. F25B 27/00
(52) U.S. Cl. ........................................ 62/323.1; 62/244
(58) Field of Search ................................ 62/323.1, 239, 62/244

(56) References Cited

U.S. PATENT DOCUMENTS

| | | | | |
|---|---|---|---|---|
| 5,142,881 A | * | 9/1992 | Nagayama | 62/228.5 |
| 5,275,011 A | * | 1/1994 | Hanson et al. | 123/179.4 |
| 5,767,380 A | * | 6/1998 | Misawa et al. | 62/210 |

FOREIGN PATENT DOCUMENTS

| | | |
|---|---|---|
| JP | 6-123517 | 5/1994 |
| JP | 6-201220 | 7/1994 |

* cited by examiner

*Primary Examiner*—William E. Tapoicai
*Assistant Examiner*—Mohammad M Ali
(74) *Attorney, Agent, or Firm*—Oblon, Spivak, McClellend, Maier & Neustadt, P.C.

(57) ABSTRACT

An object of the present invention is to provide an air conditioner which can efficiently vaporize the refrigerant using the waste heat of the engine; which has a stable heating capability regardless of the temperature of the outside air, and which can decease the electric power required for the fan and thereby decrease the noise due to the fan, in a heating operation; in order to achieve the object, the present invention provide an air conditioner comprising: a refrigerant circuit comprising a compressor for compressing a refrigerant; an outer heat exchanger for exchanging heat between the refrigerant and outside air; a restrictor for restricting the refrigerant flowing out from a water heat exchanger; and an inner heat exchanger for exchanging heat between inside air and the refrigerant; an engine cooling water circuit comprising an engine for driving the compressor; and a radiator for exchanging heat between engine cooling water and outside air; and a water heat exchanger for exchanging heat between the refrigerant circulating in the refrigerant circuit and the engine cooling water circulating in the engine cooling water circuit; wherein an evaporator comprising the outer heat exchanger and the water heat exchanger connected in parallel to the outer heat exchanger, is provided in the refrigerant circuit.

10 Claims, 6 Drawing Sheets

AIR CONDITIONER

BACKGROUND OF THE INVENTION

1. Field of the Invention

The present invention relates to an air conditioner, such as a gas engine heat pump, which uses hot water.

2. Description of the Related Art

Figure 5:
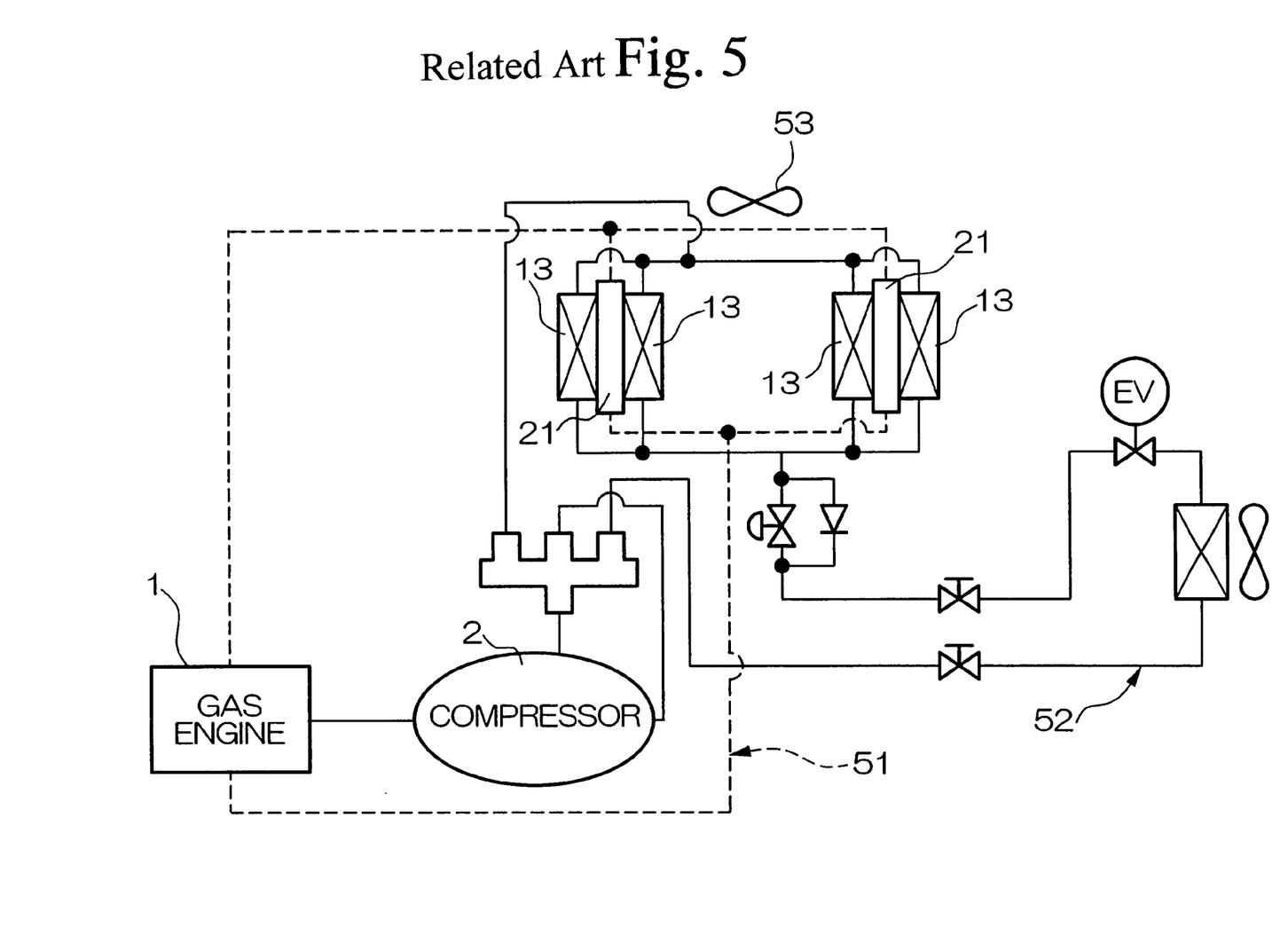
FIG. 5 shows a conventional refrigerant circuit and the engine cooling water circuit of the air conditioner.

A conventional air conditioner, which uses hot water, is shown in FIG. 5. In FIG. 5, reference number 1 denotes an engine, 2 denotes a compressor, 13 denotes an outer heat exchanger for heat exchanging between outside air and a refrigerant, 21 denotes a radiator for radiating heat of an engine cooling water, 51 denotes an engine cooling water circuit in which the engine cooling water circulates, and 52 denotes a refrigerant circuit in which the refrigerant circulates. According to this air conditioner, the radiator 21 is interposed between the outer heat exchangers 13 and 13; therefore, the refrigerant is vaporized using not only heat of the outside air but also the waste heat of the engine 1. Moreover, such structure is called "radiator interposition structure" below.

In this air conditioner, the waste heat is conducted through fins provided with the radiator and through the air, and then it is recovered. Therefore, a portion of the waste heat of the engine 1 is discharged into atmosphere, and the waste heat cannot be utilized efficiently. Due to this, the refrigerant is vaporized sufficiently in the outer heat exchanger 13 when the temperature of the outside air is low, and heating capability of the air conditioner is affected by the temperature of the outside air.

Figure 6:
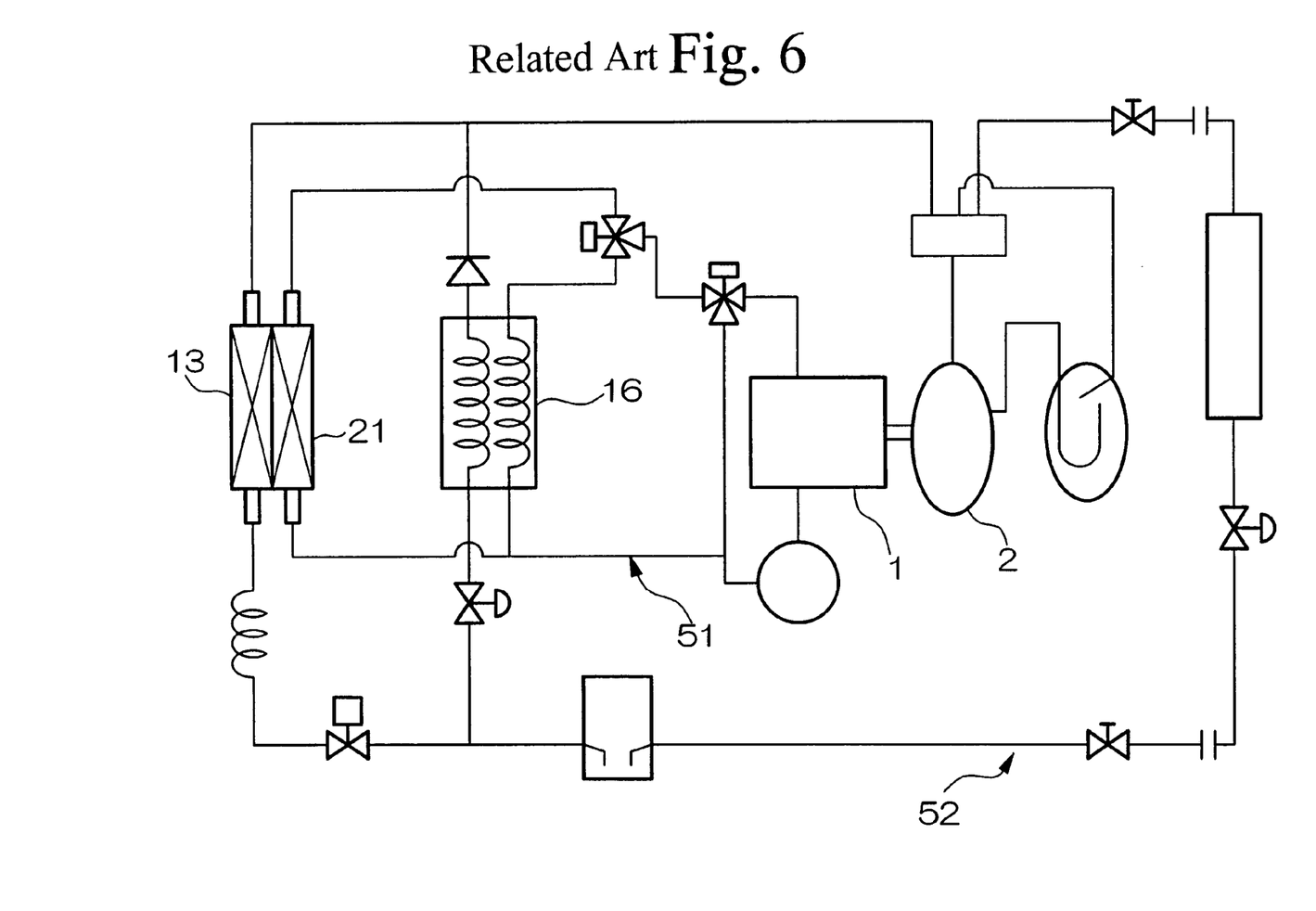
FIG. 6 shows another conventional refrigerant circuit and the engine cooling water circuit of the air conditioner.

Another conventional air conditioner is shown in FIG. 6. In this air conditioner, the water heat exchanger 16 is connected in series to the outer heat exchanger 13 in the engine cooling circuit 51 and the refrigerant circuit 52. Thereby, the waste heat of the engine 1 can be recovered by the water heat exchanger 16, in addition to the radiator 21. Moreover, such structure is called "water heat exchanger series structure" below. In this air conditioner, both the outer heat exchanger 13 and the water heat exchanger 16 resist the circulating refrigerant, and thereby the flow pressure loss of the refrigerant increases. Consequently, a large amount of refrigerant has to be contained in refrigerant circuit 52.

Moreover, in the radiator interposition structure shown in FIG. 5 and the water heat exchanger series structure shown in FIG. 6, in order to increase heat recovered to the refrigerant, it is necessary to drive a fan 53 (in FIG. 5, but not shown in FIG. 6) for introducing the outside air using a lot of force. Consequently, the problem arises that increased electric power is required for the fan 53 and the fan 53 generates noise.

Therefore, an object of the present invention is to provide an air conditioner which can efficiently vaporize the refrigerant using the waste heat of the engine; which has a stable heating capability regardless of the temperature of the outside air; and which can decrease the electric power required for the fan and thereby decrease the noise due to the fan, in a heating operation.

SUMMARY OF THE INVENTION

In order to achieve the object, the present invention provides an air conditioner comprising:

a refrigerant circuit comprising a compressor for compressing a refrigerant; an outer heat exchanger for exchanging heat between the refrigerant and outside air; a restrictor for restricting the refrigerant flowing out from a water heat exchanger; and an inner heat exchanger for exchanging heat between inside air and the refrigerant;

an engine cooling water circuit comprising an engine for driving the compressor; and a radiator for exchanging heat between engine cooling water and outside air; and a water heat exchanger for exchanging heat between the refrigerant circulating in the refrigerant circuit and the engine cooling water circulating in the engine cooling water circuit;

wherein an evaporator comprising the outer heat exchanger and the water heat exchanger connected in parallel to the outer heat exchanger, is provided in the refrigerant circuit.

According to the air conditioner, the outer heat exchanger and the water heat exchanger which is connected in parallel to the outer heat exchanger is provided in the refrigerant circuit. Specifically, the outer heat exchanger and the water heat exchanger are connected in such a way that each operates whether the one is operating or not. Therefore, according to the air conditioner of the present invention, the resistance applied to the refrigerant and the flow pressure loss of the refrigerant can be reduced. Moreover, the heat of the engine cooling water is not discharged into the atmosphere in the water heat exchanger; therefore, the engine waste heat can be utilized efficiently to heat the refrigerant.

In the air conditioner, it is preferable to further comprise an adjusting device for adjusting the amount of the refrigerant supplied into the outer heat exchanger and the water heat exchanger, in response to the temperature of the outside air.

According to the air conditioner, when the temperature of the outside air is low, for example, when it is less than 2° C., the operation of the outer heat exchanger is stopped by supplying no refrigerant into the outer heat exchanger, and thereby only the water heat exchanger is operated. The water heat exchanger utilizes the engine waste heat, and it can heat the refrigerant. Therefore, even when the temperature of the outside air is low, the refrigerant can be heated sufficiently, and a heating operation can be carried out without being affected by the temperature of the outside air. Furthermore, when the outer heat exchanger and the water heat exchanger using the engine cooling water at high temperature are operated together, the load applied to the outer heat exchanger can be reduced. Thereby, the electric power required for the fan for introducing the outside air can also be reduced; therefore, noise due to the fan can also be decreased.

In the air conditioner, it is preferable that the outer heat exchanger comprises a refrigerant pipe for falling and discharging a liquid refrigerant condensed therein, the outer heat exchanger is positioned separately from the radiator, and the refrigerant circuit further comprises a liquid refrigerant recovery pipe for flowing the liquid refrigerant discharged from the refrigerant pipe into the refrigerant circuit in which the refrigerant is flowing.

In particular, it is more preferable that the outer heat exchanger is positioned at upstream side with respect to the radiator in the flow direction of the outside air.

Moreover, it is more preferable that the refrigerant pipe is provided in the outer heat exchanger so that upstream portions are always lower than downstream portions in the flow direction of the refrigerant in the heating operation.

It is also more preferable that the refrigerant pipe provided in the outer heat exchanger comprises no sink portion.

Furthermore, it is the most preferable that the refrigerant pipe provided in the outer heat exchanger comprises a plurality of straight tube portions and a plurality of U-shaped tube portions; the straight tube portion extends so that upstream portions are always lower than downstream portions in the flow direction of the refrigerant in the heating operation; and the U-shaped tube portion is arranged between the straight tube portions so that upstream portions are always lower than downstream portions in the flow direction of the refrigerant in the heating operation.

According to the air conditioner, the radiated heat from the radiator does not reach to the outer heat exchanger. Due to this, a decrease of the cooling capability of the air conditioner can be prevented. In addition, according to the air conditioner, when the temperature of the outside air is low, the outer heat exchanger is not operated, and only the water heat exchanger is operated, the liquid refrigerant condensed in the outer heat exchanger can be fallen and discharged from the outer heat exchanger. The discharged liquid refrigerant flows through the refrigerant recovery pipe and reaches to the refrigerant circuit in which the refrigerant is circulating. Consequently, the refrigerant does not accumulate in the outer heat exchanger, and thereby a decrease of the- amount of the refrigerant circulating in the refrigerant circle can be prevented, when the temperature of the outside air is low.

In the air conditioner, it is preferable that refrigerant circuit further comprises an accumulator for accumulating a liquid refrigerant which is positioned lower than said outer heat exchanger, and the liquid refrigerant recovery pipe is connected to the accumulator.

According to the air conditioner, the liquid refrigerant which is discharged from the outer heat exchanger, flows through the refrigerant recovery pipe, and flows into the accumulator. The refrigerant recovered in the accumulator can flow in the refrigerant circuit again. Consequently, the refrigerant does not accumulate in the outer heat exchanger, and thereby a decrease of an amount of the refrigerant circulating in the refrigerant circle can be prevented.

In the air conditioner, it is preferable to further comprise a junction pipe, which connects to a refrigerant pipe extending from an exit of the outer heat exchanger and a refrigerant pipe extending from an exit of the water heat exchanger in heating operation, and which is positioned lower than the outer heat exchanger; and the refrigerant recovery pipe is connected to the junction pipe.

According to the air conditioner, the liquid refrigerant, which is fallen and discharged from the outer heat exchanger, flows through the refrigerant recovery pipe, is confluent with a gas refrigerant flowing out from the water heat exchanger, reaches into the refrigerant circuit in which the refrigerant is circulating. The refrigerant recovered in the accumulator can flow in the refrigerant circuit again, Consequently, the accumulation of the refrigerant in the outer heat exchanger can be prevented, and thereby a decrease of an amount of the refrigerant circulating in the refrigerant circle can also be prevented.

In the air conditioner, it is preferable that a constant pressure expansion valve is used as the restrictor.

When an electric expansion valve is used as the restrictor, in order to adjust the temperature of the refrigerant at the exit of the water heat exchanger in the flow direction of the refrigerant in the heating operation, it is necessary to check the pressure and the temperature of the refrigerant at the same time. In contrast, when the constant pressure expansion valve is used as the restrictor, it is not necessary to check the pressure of the refrigerant flowing out from the water heat exchanger 16 because the pressure is automatically adjusted, and it is only necessary to check its temperature. Consequently, the advantages can be obtained, that the reliability of the air conditioner can be improved, the constant pressure expansion valve itself is cheap, and an pressure sensor is not required; therefore, the cost of the air conditioner can be reduced.

DETAILED DESCRIPTION OF THE PREFERRED EMBODIMENTS

Referring to the figures, preferred embodiments of the air conditioner according to the present invention will be explained below.

Figure 1:
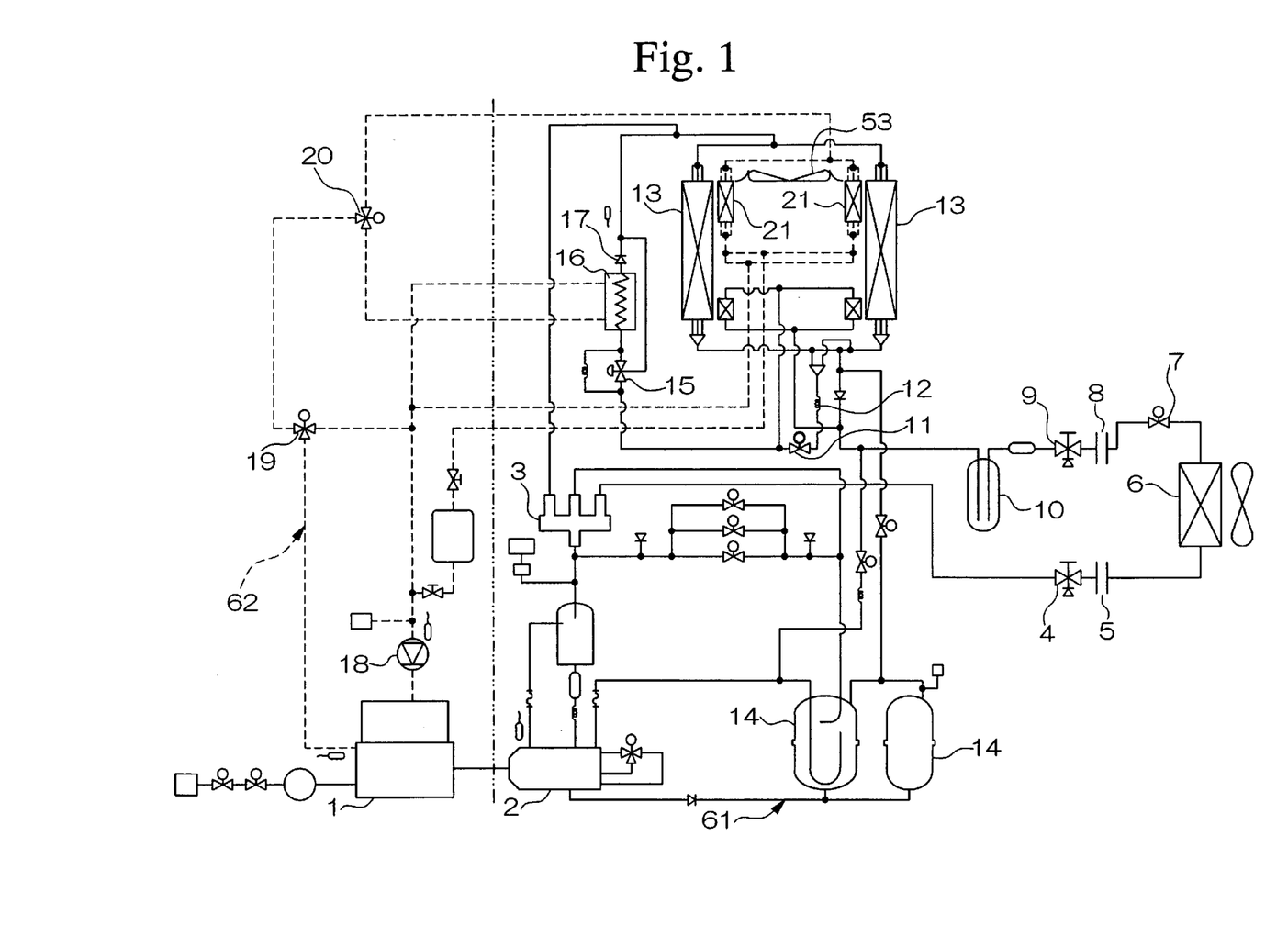
FIG. 1 shows a first embodiment of the refrigerant circuit and the engine cooling water circuit of the air conditioner according to the present invention.

FIG. 1 shows a refrigerant circuit 61 and an engine cooling water circuit 62 of an air conditioner of the first embodiment. The refrigerant circuit 61 passes through both an outer heat exchanger unit which is a main portion of an air conditioner and an inner heat exchanger unit. In contrast, the engine cooling water circuit 62 passes through only the outer heat exchanger unit.

Below, the refrigerant circuit 61 and the engine cooling water circuit 62 will be explained together with functions of elements comprising the refrigerant circuit 61 and the engine cooling water circuit 62 by classifying the operations of the air conditioner into a heating operation and a cooling operation.

First, the refrigerant circuit 61 in the heating operation will be explained. A gas refrigerant at high temperature discharged from a compressor 2 passes through a four-way valve 3, a valve 4 provided in the outer heat exchanger unit, and an inner pipe junction portion 5, and then reaches in an inner heat exchanger 6. The gas refrigerant radiates heat to an inside air in the inner heat exchanger 6. Thereby, a chamber is heated and the gas refrigerant is condensed, and liquefies.

The liquid refrigerant passes through a flow regulating valve 7, an inner pipe junction portion 8, and a valve 9 provided in the outer heat exchanger unit, and then it flows into a receiver 10. The liquid refrigerant flowing out from the receiver 10 branches into two passages.

A portion of the liquid refrigerant flowing out from the receiver 10 passes through an adjuster such as an electric valve 11 and then reaches in a restrictor 12. The pressure of the liquid refrigerant decreases in the restrictor 12. The liquid refrigerant of low pressure flows into the outer heat exchanger 13. The liquid refrigerant absorbs heat from the outside air introduced by a fan 53, and a portion of the liquid refrigerant vaporizes. Therefore, the refrigerant becomes a refrigerant mixture containing a gas refrigerant and a liquid refrigerant. The refrigerant mixture passes through the four-way valve 3, and then flows into an accumulator 14. In the accumulator 14, the liquid refrigerant contained in the refrigerant mixture is separated, and then the gas refrigerant returns into the compressor 2.

The remainder of the liquid refrigerant flowing out from the receiver 10 is decompressed in a constant pressure expansion valve 15, and then it becomes a liquid refrigerant of low pressure. After that, the liquid refrigerant of low pressure reaches in a water heat exchanger 16. The liquid refrigerant exchanges heat with an engine cooling water circulating in the engine cooling water circuit 62 in the water heat exchanger 16. Namely, the liquid refrigerant absorbs heat from the engine cooling water, and then it vaporizes and becomes a gas refrigerant. After that, the gas refrigerant passes through a check valve 17 and the four-way valve 3, and flows into the accumulator 14. When the refrigerant passing through the four-way valve 3 is a mixture containing a gas refrigerant and a liquid refrigerant, the liquid refrigerant is separated from the gas refrigerant in the accumulator 14, and the gas refrigerant returns into the compressor 2.

As explained above, the refrigerant circuit 61 comprises an evaporator used in the heating operation, which comprises the outer heat exchanger and the water heat exchanger connected in parallel the said outer heat exchanger. Therefore, the air conditioner comprising such refrigerant circuit 61 can decrease the resistance applied to the refrigerant and the flow pressure loss of the refrigerant. Thereby, the air conditioner in this embodiment can decrease the amount of the refrigerant contained in the refrigerant circuit 61, compared with an air conditioner comprising the refrigerant circuit 61 provided with an evaporator comprising the outer heat exchanger 13 and the water heat exchanger 16 arranged in series to the outer heat exchanger 13.

Moreover, the heat of the engine cooling water is not discharged into the atmosphere in the water heat exchanger 16; therefore, the engine waste heat can be utilized efficiently to heat the refrigerant in this embodiment.

Furthermore, the opening of the electric valve 11 is adjusted in response to the temperature of the outside air, which is measured by an outside air temperature sensor (not shown in FIG. 1) in this embodiment.

In order to prevent the outer heat exchanger 13 from frosting, the electric valve 11 is opened and the outer heat exchanger 13 and the water heat exchanger 16 are usually operated together. However, when the temperature of the outside air is low, for example, when it is less than 2° C., the operation of the outer heat exchanger 13 is stopped by closing the electric valve 11, and thereby only the water heat exchanger 16 is operated. The water heat exchanger 16 utilizes the engine waste heat at high temperature. Therefore, even when the temperature of the outside air is low, the refrigerant can be heated sufficiently, and a heating operation can be carried out without being affected by the temperature of the outside air.

Moreover, when the electric valve 11 is opened and the outer heat exchanger 13 and the water heat exchanger 16 are operated together, the load applied to the outer heat exchanger 13 can be decreased, and thereby the electric power required for the fan 53 for cooling the outer heat exchanger 13 can also be decreased. Therefore, noise due to the fan 53 can also be decreased.

Furthermore, the constant pressure expansion valve 15 is used as a restrictor, therefore, it is not necessary to check the pressure of the refrigerant flowing out from the water heat exchanger 16 in the heating operation, and it is only necessary to check its temperature. Consequently, the advantages can be obtained, that the reliability of the air conditioner can be improved, the constant pressure expansion valve 15 itself is cheap, and an pressure sensor is not required; therefore, the cost of the air conditioner can be reduced, compared with an air conditioner in which an electric expansion valve is used as a restrictor.

Next, the engine cooling water circuit 62 will be explained together with functions of elements comprising the engine cooling water circuit 62 in the heating operation. The engine cooling water is sent into an engine 1 by a pump 18, receives heat from the engine 1, and then it is heated to a high temperature. After that, the high temperature water flows into the first three-way valve 19. Until the temperature of the engine cooling water at the entrance of the engine 1 rises to a certain temperature, the engine cooling water passes through the first three-way valve 19 and it flows into the pump 18. Due to this, the temperature of the engine 1 can be maintained at a suitable temperature. When the temperature of the engine cooling water is higher than the certain temperature, the engine cooling water passes through the first three-way valve 19, and flows into the second three-way valve 20.

The second three-way valve 20 makes the engine cooling water flow into the water heat exchanger 16 so that the refrigerant at the exit of the water heat exchanger 16 is at a predetermined temperature. In the water heat exchanger 16, the engine cooling water radiates heat to the refrigerant circulating in the refrigerant circuit 61, and then it is cooled and returns to the pump 18. When the entire engine cooling water does not make flow into the water heat exchanger 16, the remainder of the engine cooling water flows into a radiator 21, radiates heat to the outside air introduced by the fan 53, and then it cools and returns to the pump 18.

Below, the refrigerant circuit 61 will be explained together with functions of the elements comprising the refrigerant circuit 61 in the cooling operation. The gas refrigerant at high temperature discharged by the compressor 2 passes through the four-way valve 3, and then flows into the outer heat exchanger 13. In the outer heat exchanger 13, the gas refrigerant at high temperature radiates heat to the outside air, and then it is condensed, and liquefied. The liquid refrigerant is decompressed in the restrictor 12, passes through the electric valve 11, and then it flows into the receiver 10. The refrigerant flows out from the receiver 10, passes through the valve 9, the inner pipe junction portion 8, and then it flows into the regulating valve 7, which acts as an expansion valve in the cooling operation.

The liquid refrigerant is decompressed and becomes the liquid refrigerant of low pressure in the regulating valve 7, and it flows into the inner heat exchanger 6. In the inner heat exchanger 6, the liquid refrigerant of low pressure absorbs heat from the inside air, and then it vaporizes and becomes a gas refrigerant. Moreover, the temperature of the inside air decreases. The gas refrigerant passes through the inner pipe junction portion 5, the valve 4, the four-way valve 3, and the accumulator 14, and then it returns to the compressor 2.

Next, the engine cooling water circuit 62 will be explained together with functions of the elements comprising the engine cooling water circuit 62 in the cooling operation. The engine cooling water is sent into the engine 1 by the pump 18, is heated due to heat from the engine 1, and it flows into the first three-way valve 19, similarly to the heating operation. However, the first three-way valve 19 makes the entire engine cooling water at high temperature flow into the radiator 21. The engine cooling water at high temperature radiates heat to the outside air introduced by the fan 53, and it cools in the radiator 21. After that, the engine cooling water returns to the pump 18.

Moreover, the wind flow direction of the outside air is from the outer heat exchanger 13 to the radiator 21. In addition, the outer heat exchanger 13 and the radiator 21 are separated in this embodiment. Therefore, the radiated heat from the radiator 21 does not reach to the outer heat exchanger 13. Due to this, while the cooling operation, a reduction in the heat discharge properties of the outer heat exchanger 13 can be prevented, and thereby the pressure increase in the outer heat exchanger 13 can also be prevented. Consequently, a decrease of the cooling capability of the air conditioner can be prevented. Moreover, the air conditioner can cool under conditions in which the conventional air conditioner cannot cool effectively.

As explained above, the radiator 21 is separated from the outer heat exchanger 13 in this first embodiment. Therefore, when the outer heat exchanger 13 is not operated and only the water heat exchanger 16 is operated, and the temperature of the outside air is lower than the evaporating temperatures of the refrigerant, there is a possibility that the refrigerant is condensed and accumulates in the outer heat exchanger 13. Consequently, there is a possibility that an amount of the refrigerant circulating in the refrigerant circuit 61 decreases, when the temperature of the outside air is low.

From view of the accumulation of the refrigerant in the outer heat exchanger 13 and the decrease of the refrigerant circulating in the refrigerant circuit 61, the following second embodiment is more preferable in the present invention.

Figure 2:
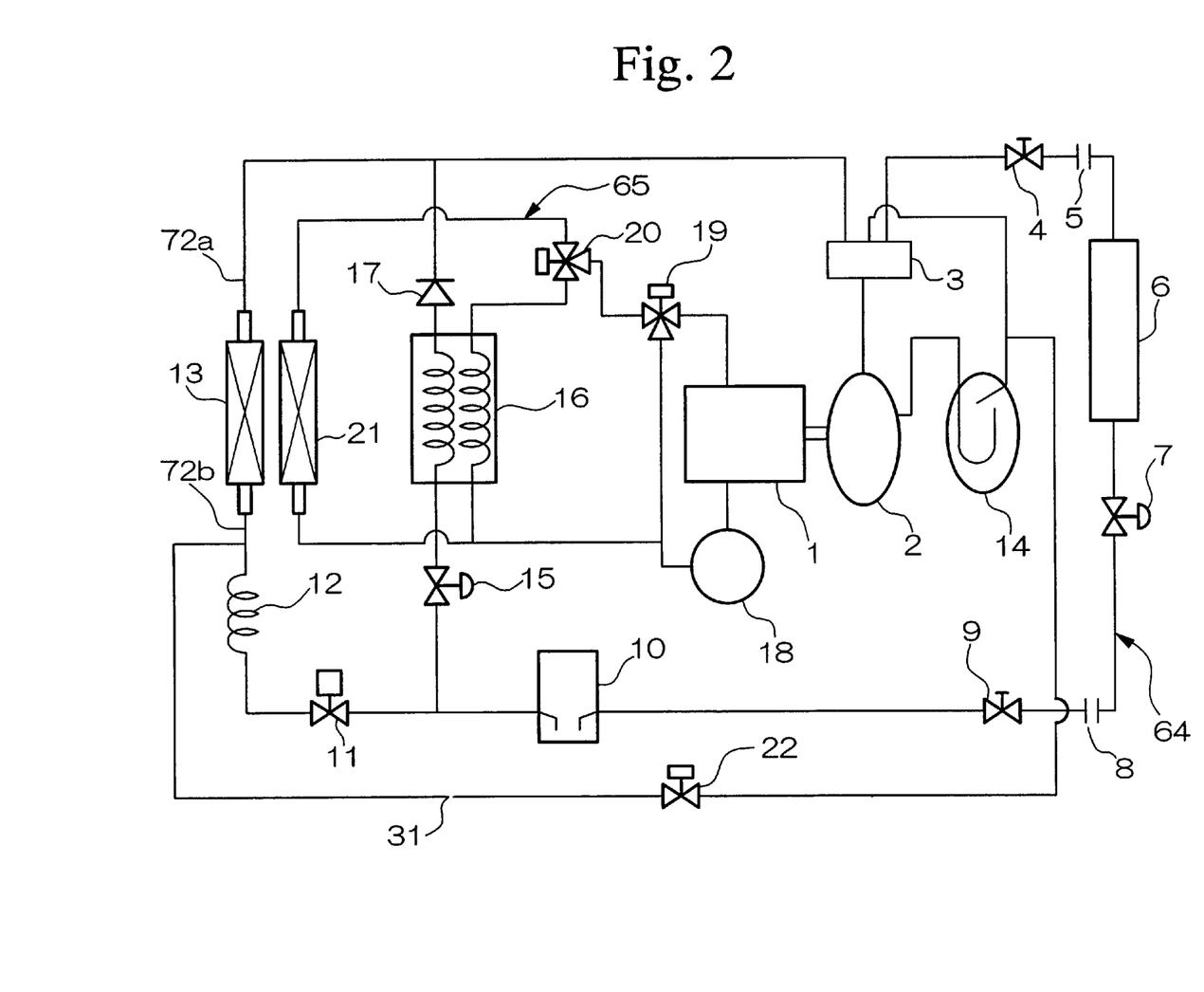
FIG. 2 shows a second embodiment of the refrigerant circuit and the engine cooling water circuit of the air conditioner according to the present invention.
Figure 3A:
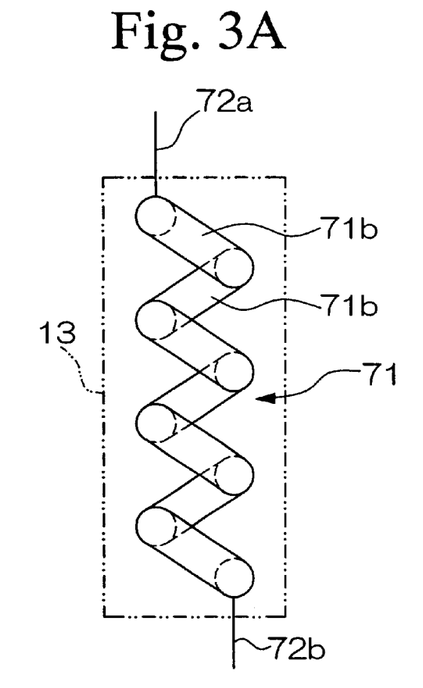
FIG. 3A shows an example of the refrigerant pipe provided in the outer heat exchanger shown in FIG. 2.
Figure 3B:
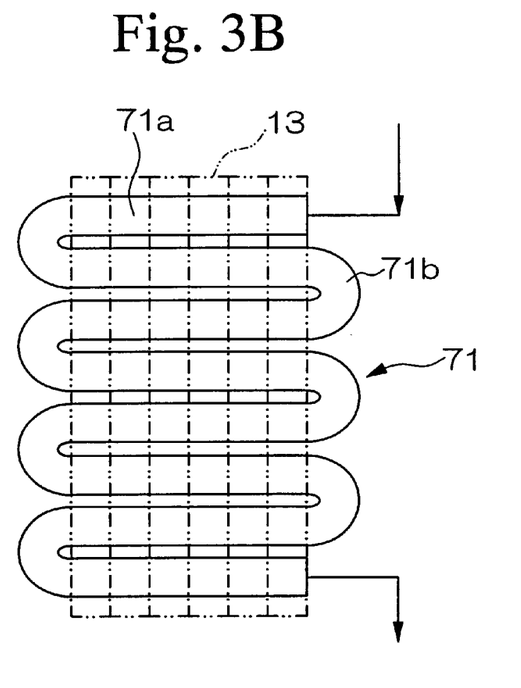
FIG. 3B also shows an example of the refrigerant pipe provided in the outer heat exchanger shown in FIG. 2.
Figure 3C:
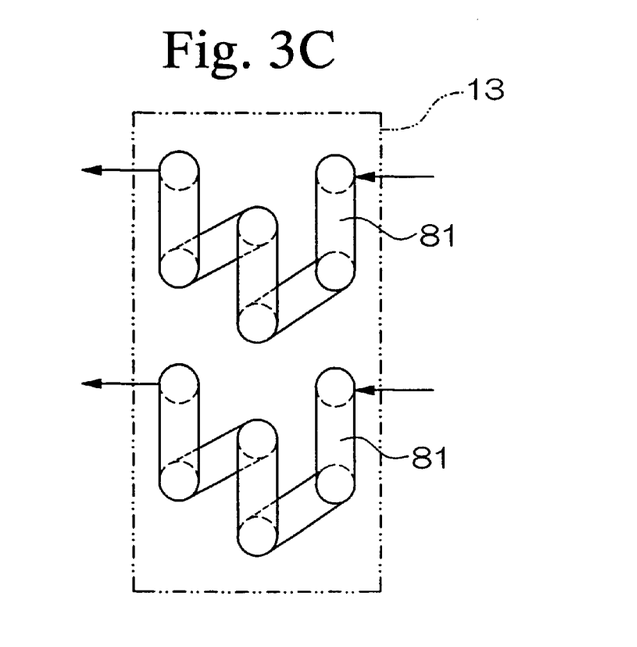
FIG. 3C shows a conventional refrigerant pipe provided in the outer heat exchanger in the refrigerant circuit.

FIG. 2 shows a refrigerant circuit 64 and an engine cooling water circuit 65 of an air conditioner of the second embodiment. In particular, as shown in FIGS. 3A and 3B, the air conditioner of this embodiment comprises a refrigerant pipe 71 in the outer heat exchanger 13 different from a conventional refrigerant pipe 81 shown in FIG. 3C. This conventional refrigerant pipe 81 extends up and down in the outer heat exchanger 13. In other words, some downstream portions are higher than the upstream portions in the flow direction of the refrigerant in the heating operation. That is, there are some sink portions in the refrigerant pipe 81 in the flow direction of the refrigerant. Therefore, there is the possibility that the liquid refrigerant accumulates in the sink portions, and it is not discharged from the outer heat exchanger 13. When the refrigerant is accumulated in the outer heat exchanger 13, the amount of the refrigerant circulating in the refrigerant circle decreases.

In contrast, the refrigerant pipe 71 provided in the outer heat exchanger 13 according to this embodiment comprises a plurality of straight tube portions 71a and a plurality of U-shaped tube portions 71b, which are arranged between the straight tube portions 71a, as shown in FIGS. 3A and 3B. The refrigerant pipe 71 extends upwardly from the bottom end portion to the top end portion. Namely, the downstream portions are always higher than the upstream portions in the flow direction of the refrigerant in the heating operation. Specifically, the straight tube portion 71a always extends upwardly from an upstream portion to a downstream potion. Otherwise, the straight tube portion 71a extends at least horizontally so as not extend downwardly. In the U-shaped tube portion 71b, the upstream portion is also always lower than the downstream portion in the flow direction of the refrigerant in the heating operation.

In FIGS. 2, and 3A, the bottom end portion of the refrigerant pipe 71 is connected to the refrigerant pipe 72b. Namely, the upstream end portion of the refrigerant pipe 71 is connected to the refrigerant pipe 72b in the heating operation. The refrigerant pipe 72b is connected to the restrictor 12. The liquid refrigerant recovery pipe 31 extends from the refrigerant pipe 72b between the outer heat exchanger 13 and the restrictor 12. The liquid refrigerant recovery pipe 31 extends to the accumulator 14 which is positioned lower than the outer heat exchanger 13. Moreover, the valve 22 is provided in the liquid refrigerant recovery pipe 31.

Moreover, in FIGS. 2 and 3A, the top end portion of the refrigerant pipe 71 is connected to the refrigerant pipe 72a. Namely, the downstream end portion thereof is connected to the refrigerant pipe 72a in the heating operation. The refrigerant pipe 72a is connected to the four-way valve 3.

According to this embodiment, the downstream portions are always higher than the upstream portions in the flow direction of the refrigerant in the heating operation. Namely, the refrigerant pipe 71 always extends upwardly from the bottom end portion to the top end portion. Therefore, when the temperature of the outside air is low, the outer heat exchanger 13 is not operated, and only the water heat exchanger 16 is operated; the liquid refrigerant, which is condensed in the refrigerant pipe 71 provided in the outer heat exchanger 13, can fall and be discharged from the outer heat exchanger 13. The discharged liquid refrigerant flows through the refrigerant pipe 72b and the liquid refrigerant recovery pipe 31, and it is recovered in the accumulator 14. Consequently, the refrigerant does not accumulate in the outer heat exchanger 13, and thereby a decrease of an amount of the refrigerant circulating in the refrigerant circle 61 can be prevented, when the temperature of the outside air is low.

Figure 4:
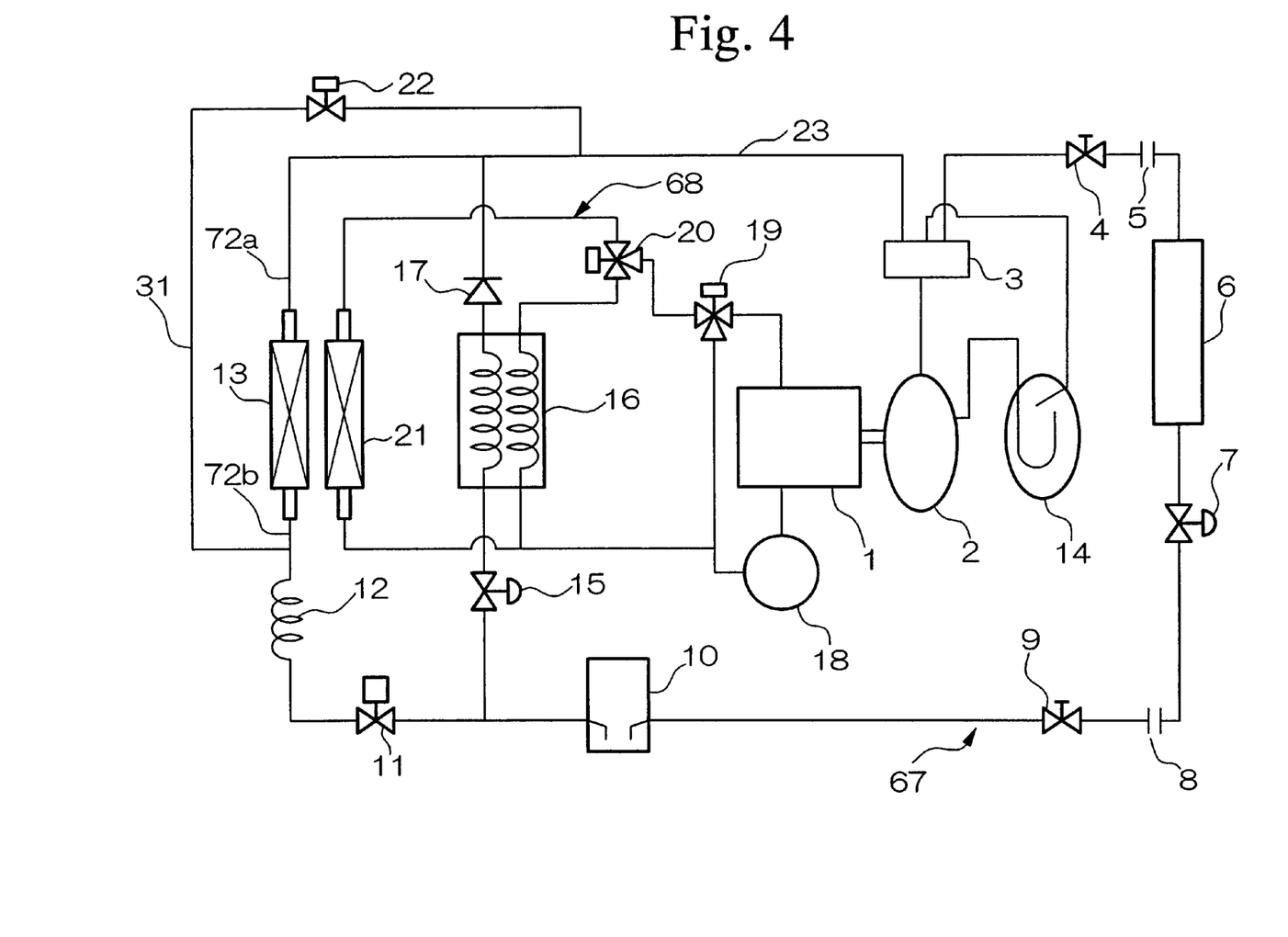
FIG. 4 shows a third embodiment of the refrigerant circuit and the engine cooling water circuit of the air conditioner according to the present invention.

FIG. 4 shows a refrigerant circuit 67 and an engine cooling water circuit 68 of an air conditioner of the third embodiment according to the present invention.

As shown in FIG. 4, the refrigerant pipe 72a extends from the exit of the outer heat exchanger 13 in the heating operation to the junction pipe 23. The refrigerant pipe which extends from the exit of the water heat exchanger 16 in the heating operation is also connected to the junction pipe 23. Furthermore, the liquid refrigerant recovery pipe 31 also extends from the refrigerant pipe 72 to the junction pipe 23. That is, all the refrigerant passing through the refrigerant pipe 72a, the refrigerant passing thorough the refrigerant pipe which extends from the exit of the water heat exchanger 16, and the refrigerant passing through the liquid refrigerant recovery pipe 31, flow into the junction pipe 23. In particular, the junction pipe 23 is positioned lower than the outer heat exchanger 13.

When the outer heat exchanger 13 is not operated and only the water heat exchanger 16 is operated, and thereby the refrigerant is condensed in the outer heat exchanger 13; the liquid refrigerant can fall and be discharged from the outer heat exchanger 13, and it can pass through the refrigerant recovery pipe 31 and can flow into the junction pipe 23, in this embodiment. Then, the liquid refrigerant is confluent with the gas refrigerant flowing out from the water heat exchanger 16 in the junction pipe 23. After that, the liquid refrigerant and the gas refrigerant pass through the four-way valve 3, and they flow into the accumulator 14. Therefore, the accumulation of the liquid refrigerant in the outer heat exchanger 13 can be prevented and then the decrease of the refrigerant circulating in the refrigerant circle 61 can also be prevented, in this embodiment.

What is claimed is:

1. An air conditioner comprising:
   a refrigerant circuit including:
   a compressor for compressing a refrigerant;
   an outer heat exchanger for exchanging heat between said refrigerant and outside air;
   a restrictor for restricting said refringerant flowing out from a water heat exchanger; and
   an inner heat exchanger for exchanging heat between inside air and said refrigerant;
   an engine cooling water circuit including:
   an engine for driving said compressor; and
   a radiator for exchanging heat between engine cooling water and said outside air, wherein said water heat exchanger of said refrigerant circuit exchanges heat between said refrigerant circulating in said refrigerant circuit and said engine cooling water circulating in said engine cooling water circuit; and
   an evaporator including said outer heat exchanger and said water heat exchanger, wherein said water heat exchanger is connected in parallel to said outer heat exchanger, and wherein said evaporator is provided in said refrigerant circuit.

2. The air conditioner according to claim 1, further comprising an adjusting device for adjusting an amount of said refrigerant supplied into said outer heat exchanger and said water heat exchanger, in response to a temperature of said outside air.

3. The air conditioner according to claim 1, wherein said outer heat exchanger includes a refrigerant pipe in which said refrigerant is allowed to condense to form a liquid refrigerant, said liquid refrigerant being allowed to fall from said refrigerant pipe to be discharged from said outer heat exchanger, said outer heat exchanger being positioned separately from said radiator, and wherein said refrigerant circuit further comprises a liquid refrigerant recovery pipe for flowing said liquid refrigerant discharged from said outer heat exchanger into said refrigerant in which said refrigerant is flowing.

4. The air conditioner according to claim 3, wherein said refrigerant circuit further comprises an accumulator for accumulating said liquid refrigerant discharged from said outer heat exchanger, said accumulator being positioned lower than said outer heat exchanger, and wherein said liquid refrigerant recovery pipe is connected to said accumulator.

5. The air conditioner according to claim 3, further comprising a junction pipe connected to said refrigerant pipe, said refrigerant pipe extending from an exit of said outer heat exchanger in a heating operation and to a refrigerant pipe extending from an exit of said water heat exchanger in said heating operation, said water heat exchanger being positioned lower than said outer heat exchanger, and wherein said liquid refrigerant recovery pipe is connected to said junction pipe.

6. The air conditioner according to claim 1, wherein said restrictor is consituted of a constant pressure expansion valve.

7. The air conditioner according to claim 3, wherein said refrigerant pipe is provided in said outer heat exchanger so that upstream portions are always lower than downstream portions in a flow direction of said refrigerant in a heating operation.

8. The air conditioner according to claim 7, wherein said refrigerant pipe provided in said outer heat exchanger does not have a sink portion.

9. The air conditioner according to claim 7, wherein said refrigerant pipe provided in said outer heat exchanger comprises a plurality of straight tube portions and a plurality of U-shaped tube portions a straight tube portion of said plurality of straight tube portions extends so that upstream portions of said straight tube portion are always lower than downstram portions of said straight tube portion in said flow direction of said refrigerant in said heating operation, and a U-shaped portion of said plurality of U-shaped tube portions is arranged between said plurality of straight tube portions so that upstream portions of said U-shaped tube portion are always lower than downstream portions of said U-shaped tube portion in said flow direction of said refrigerant in said heating operation.

10. The air conditioner according to claim 3, wherein said outer heat exchanger is positioned at an upstream side with respect to said radiator in a flow direction of said outside air.

* * * * *